(12) United States Patent
Jia et al.

(10) Patent No.: US 12,113,471 B1
(45) Date of Patent: Oct. 8, 2024

(54) FAN DRIVE SYSTEM AND FAN

(71) Applicant: Unirise Electronics Co.,Ltd., Dongguan (CN)

(72) Inventors: Yinhua Jia, Shenzhen (CN); Guorong Zhang, Dongguan (CN)

( * ) Notice: Subject to any disclaimer, the term of this patent is extended or adjusted under 35 U.S.C. 154(b) by 0 days.

(21) Appl. No.: 18/510,028

(22) Filed: Nov. 15, 2023

(30) Foreign Application Priority Data

Sep. 5, 2023 (CN) .......................... 202322410223.2

(51) Int. Cl.
*H02P 1/46* (2006.01)
*H02P 7/292* (2016.01)

(52) U.S. Cl.
CPC ................................. *H02P 7/292* (2013.01)

(58) Field of Classification Search
CPC .... H02P 7/292; H02P 6/08; H02P 6/06; H02P 7/00; H02P 27/06
See application file for complete search history.

(56) References Cited

FOREIGN PATENT DOCUMENTS

| CN | 218442836 U | * 2/2023 |
| CN | 220067273 U | * 11/2023 |

* cited by examiner

*Primary Examiner* — Karen Masih

(57) ABSTRACT

The present disclosure relates to a fan drive system and a fan. The fan drive system comprises an AC power supply, a filter unit, a rectifier unit, a bus capacitor, a switching power supply, a bus voltage isolation detection circuit and a DC motor drive unit. Wherein a speed regulation switch is provided between the AC power supply and the filter unit having an output end connected to an input end of the rectifier unit with an output end connected to an input end of the switching power supply. The circuit is configured to detect voltages at two ends of the bus capacitor, an output end of the switching power supply is connected to the DC motor drive unit for supplying power, and an output end of the circuit is connected to the DC motor drive unit for inputting speed regulation signals. The DC motor drive unit is connected to a DC motor for driving the DC motor.

10 Claims, 8 Drawing Sheets

FAN DRIVE SYSTEM AND FAN

BACKGROUND

Technical Field

The present disclosure relates to a field of electric appliances, and in particular, to a fan drive system and a fan.

Related Art

At present, most civil fans (such as top fans, wall fans, and exhaust fans) adopt an alternating current motor that is directly driven by alternating current, and the speed regulation is also based on the switched capacitor current-limiting speed regulation of the alternating current motor. The speed regulation capacitor is usually integrated in a switch box or other existing mechanisms. If a direct current motor drive system is adopted, modules such as the existing switch box cannot be basically used; consequently, the existing materials cannot be used and customers cannot adapt to this system. Therefore, there is a need to develop a new module to be matched with the direct current motor drive system.

However, the alternating current fan motor is large and consumes power. After the alternating current motor is changed to a direct current motor matched with a direct current motor drive system, power can be saved and the size of the motor can be reduced, which will bring competitiveness to the manufacturers. Therefore, how to implement a direct current motor matched with a direct current motor drive system based on existing materials at low cost is an issue that needs to be solved urgently.

In addition, the speed regulation of a direct current drive system is generally on a low voltage side, and when the direct current drive system is actually used, a speed regulation switch and a speed regulation system are complicated, which causes inconvenience to manufacturers and customers.

SUMMARY

In order to solve the problems existing in the prior art, the present disclosure provides a fan drive system and a fan.

To achieve the above objective, the present disclosure adopts the following technical solutions.

The fan drive system comprises, an alternating current power supply, a filter unit, a rectifier unit, a bus capacitor, a switching power supply, and a direct current motor drive unit; wherein
- a speed regulation switch is provided between the alternating current power supply and the filter unit, an output end of the filter unit is connected to an input end of the rectifier unit, and an output end of the rectifier unit is connected to an input end of the switching power supply;
- the switching power supply comprises a bus voltage isolation detection circuit, the bus voltage isolation detection circuit is configured to detect voltages at two ends of the bus capacitor, an output end of the switching power supply is connected to the direct current motor drive unit for supplying power, and an output end of the bus voltage isolation detection circuit is connected to the direct current motor drive unit for inputting a speed regulation signal; and
- the direct current motor drive unit is connected to a direct current motor for driving the direct current motor.

Preferably, the speed regulation switch is arranged at a live wire or a neutral wire between the alternating current power supply and the filter unit.

Preferably, the speed regulation switch comprises: a plurality of capacitors arranged in parallel and a gear selection switch, the plurality of capacitors arranged in parallel have different capacities, and the gear selection switch is selectively connected to different capacitors.

Preferably, the filter unit comprises, a fuse FS1 connected to an output end of the speed regulation switch, a thermistor NTC1 connected to an output end of the fuse FS1, and an inductor L4, a filter capacitor CM2, a filter capacitor CMP3 and a filter capacitor CMP4 that are connected to an output end of the thermistor.

Preferably, the rectifier unit comprises a rectifier chip M1 connected to two output ends of the inductor L4.

Preferably, the switching power supply comprises, a power supply control chip IC1, a transformer T1, a first output power supply circuit, and the bus voltage isolation detection circuit; and the first output power supply circuit is connected to a first output end of the transformer T1 for outputting a 24V driving voltage, an input end of the bus voltage isolation detection circuit is connected to a second output end of the transformer T1, and the output end of the bus voltage isolation detection circuit is connected to a drive control chip of the direct current motor drive unit.

Preferably, the first output power supply circuit comprises: a unilateral diode D1 connected to the first output end of the transformer T1, a filter capacitor CAL2 connected to a negative pole of the unilateral diode D1, a parallel resistor R50 connected to the filter capacitor CAL2 in parallel, and a parallel capacitor C2 connected to the parallel resistor R50 in parallel. A first end of the parallel capacitor C2 is connected to the negative pole of the unilateral diode D1 and a source of the drive chip U3, and a second end of the parallel capacitor C2 is grounded.

Preferably, the bus voltage isolation detection circuit comprises: a unilateral diode D3 connected to the second output end of the transformer T1, a series resistor R28 connected to a negative pole of the unilateral diode D3, a series resistor R31 connected to the series resistor R28 in series, and a clamp diode D7 having a positive pole connected to the series resistor R31 and an output end connected to a speed regulation input end pin of the drive control chip.

Preferably, the output end of the rectifier unit is provided with a bus capacitor CAL1, the bus voltage isolation detection circuit comprises a unilateral diode D3 connected to the second output end of the transformer T1, a series resistor R28 connected to the negative pole of the unilateral diode D3, a series resistor R31 connected to the series resistor R28 in series, and a clamp diode D7 having a positive pole connected to the series resistor R31 and an output end connected to a speed regulation input end pin of the drive control chip.

The present disclosure also provides a fan, comprising a fan blade, a direct current motor, and the fan drive system mentioned above.

The beneficial effects of the present disclosure are as follows.

The present disclosure combines capacitor current-limiting speed regulation of an alternating current fan with analog signal control speed regulation of a single chip microcomputer driven by a brushless direct current motor; the speed is regulated through a capacitor switch on a high-voltage input side, and the speed regulation circuit is simple, high in reliability and low in cost. Meanwhile, a fan manufacturer can still use an original capacitor speed regulation switch box for speed regulation of an alternating current fan without replacement, and the product has continuity.

DETAILED DESCRIPTION

Figure 1:
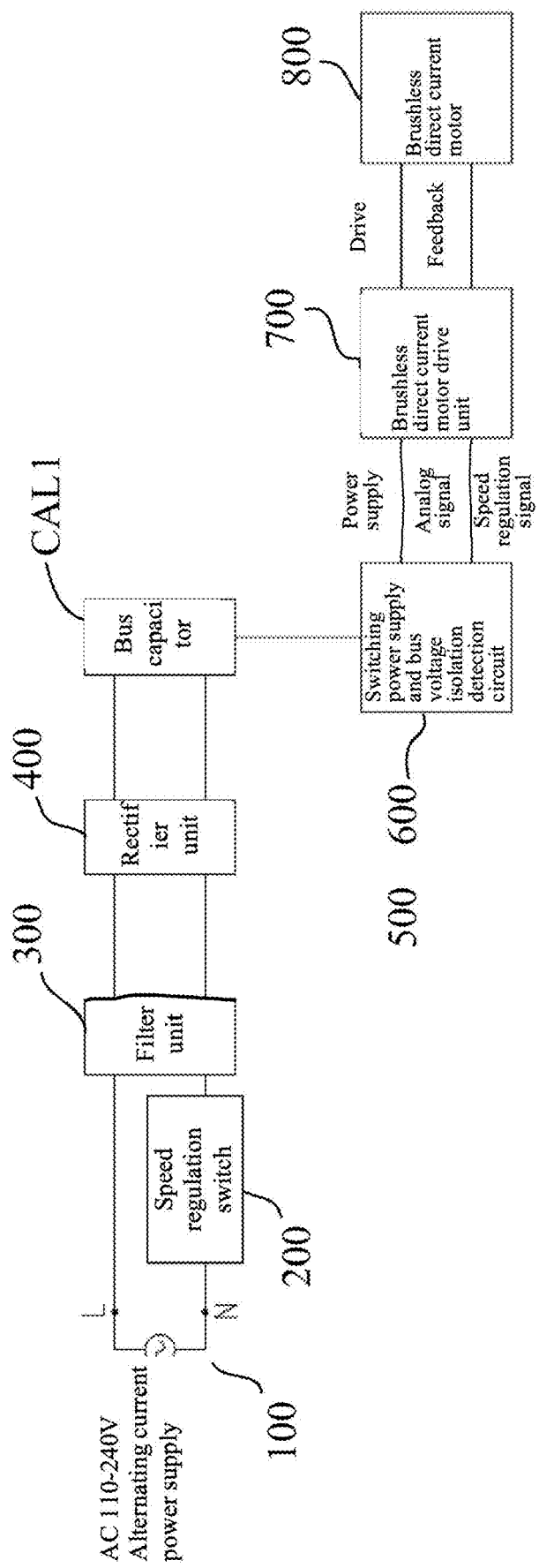
FIG. 1 is a schematic diagram of a structure of a fan drive system according to the present invention.

The present disclosure will be described below in detail in combination with preferred embodiments and attached drawings as shown in FIG. 1 to FIG. 7.

In the description of the present disclosure, it should be understood that directions or positional relationships indicated by the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise", and the like are those shown based on the accompanying drawings, and are merely intended to facilitate and simplify description rather than indicate or imply that the indicated device or element must have a specific direction and must be configured and operated according to the specific direction. Therefore, these directions or positional relationships should not be construed as limiting the present disclosure.

In the present disclosure, unless otherwise specified and limited, the terms such as "mount", "link", "connect", and "fasten" should be understood broadly. For example, the term "connect" may be a fixed connection, may be a detachable connection, or may be integration; may be a mechanical connection or may be an electrical connection; or may be a direct connection, may be an indirect connection implemented by using an intermediate medium, or may be communication inside two elements or an interaction relationship between two elements. Those of ordinary skill in the art may understand specific meanings of the foregoing terms in the present disclosure according to specific cases.

Referring to FIGS. 1 to 7, the present disclosure provides a fan drive system, which comprises an alternating current power supply 100, a filter unit 300, a rectifier unit 400, a bus capacitor CAL1, a switching power supply 500, a bus voltage isolation detection circuit 520, and a direct current motor drive unit 700. A speed regulation switch 200 is provided between the alternating current power supply 100 and the filter unit 300, an output end of the filter unit 300 is connected to an input end of the rectifier unit 400, and an output end of the rectifier unit 400 is connected to an input end of the switching power supply 500.

In this embodiment, an output end of the switching power supply 500 is connected to the direct current motor drive unit 700 for supplying power, and an output end of the bus voltage isolation detection circuit is connected to the direct current motor drive unit for inputting a speed regulation signal; and the direct current motor drive unit 700 is connected to a direct current motor 800 for driving the direct current motor.

In this embodiment, the speed regulation switch 200 is arranged at a live wire or a neutral wire between the alternating current power supply 100 and the filter unit 300. That is, the speed regulation switch 200 is arranged on a high-voltage input side of the fan drive system, therefore, the speed regulation circuit can be relatively easily implemented without replacing the other modules integrally, for example, without replacing the original speed regulation switch box, so that the existing material has continuity.

Figure 2:
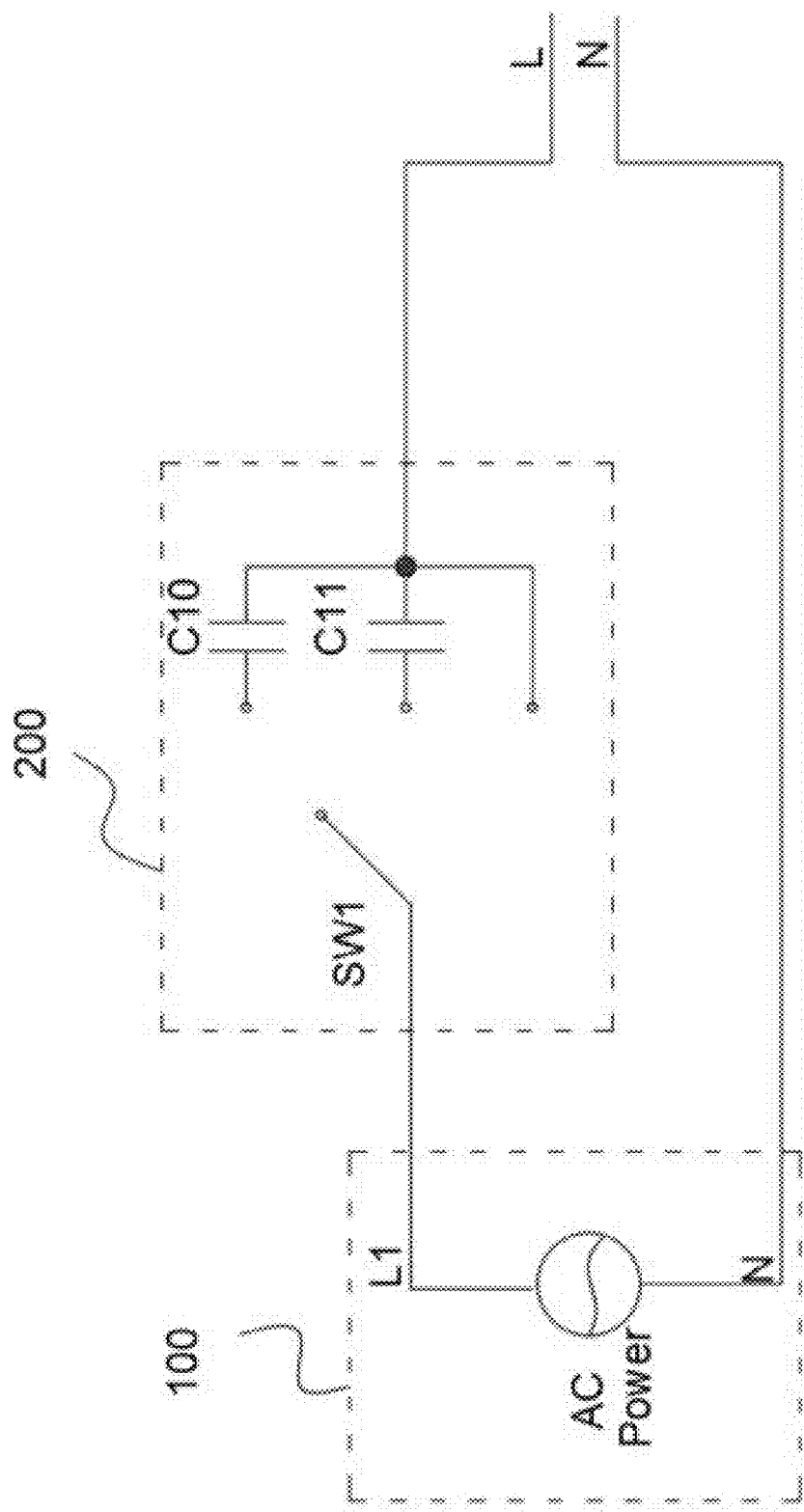
FIG. 2 is a schematic diagram of a circuit of a speed regulation switch of the fan drive system according to the present invention.
Figure 3:
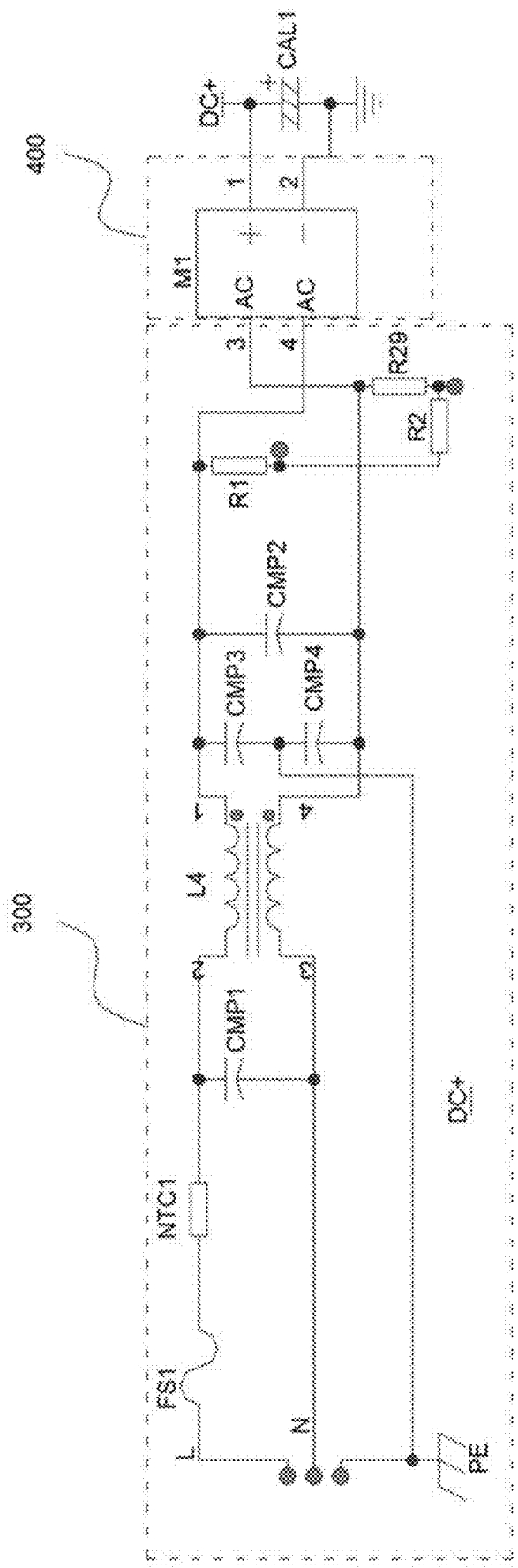
FIG. 3 is a schematic diagram of a circuit of a filter unit and a rectifier unit of the fan drive system according to the present invention.
Figure 4:
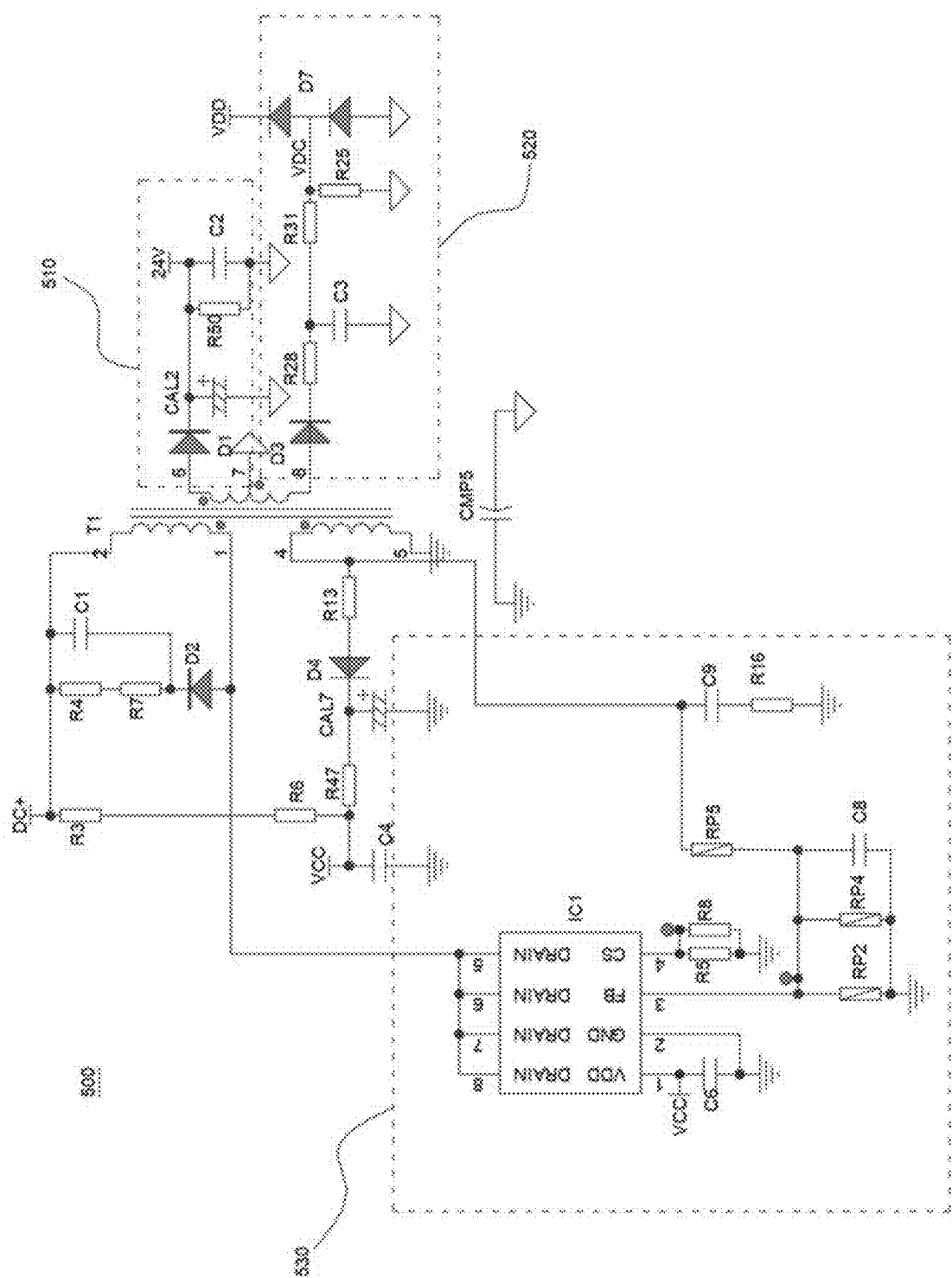
FIG. 4 is a schematic diagram of a switching power supply and a detection circuit of the fan drive system according to the present invention.

As shown in FIG. 2, in a preferred embodiment, the speed regulation switch comprises a plurality of capacitors (C10, C11 . . . ) arranged in parallel and a gear selection switch SW1, wherein the plurality of capacitors arranged in parallel have different capacities (set based on the gear adjustment corresponding to a preset capacitance value), and the gear selection switch SW1 is selectively connected to different capacitors.

Certainly, in some embodiments, the speed regulation can also be implemented by using a plurality of output points of a transformer, a secondary coil of the transformer outputs different voltages, and resistors are connected in series with different resistance values. Alternatively, the purpose of speed regulation can be achieved by changing the winding of the motor or changing the pulse width of the waveform at an alternating current end. The speed regulation can also be implemented by changing the resistance value by using a knob-type rheostat, wherein the change in resistance value reflects the change in the voltage at two ends of the bus capacitor.

In this embodiment, the filter unit 300 comprises a fuse FS1 connected to an output end of the speed regulation switch, a thermistor NTC1 connected to an output end of the fuse FS1, and an inductor L4, a filter capacitor CM2, a filter capacitor CMP3 and a filter capacitor CMP4 that are connected to an output end of the thermistor.

Further, the rectifier unit comprises a rectifier chip M1 (with a model of ABS210) connected to two output ends of the inductor L4.

In this embodiment, the switching power supply comprises a power supply control chip circuit 530, a transformer T1, a first output power supply circuit 510, and a bus voltage isolation detection circuit 520. The first output power supply circuit 510 is connected to a first output end of the transformer T1 outputting a 24V driving voltage, an input end of the bus voltage isolation detection circuit 520 is connected to a second output end of the transformer T1, and an output end of the bus voltage isolation detection circuit 520 is connected to a drive control chip U3 of the direct current motor drive unit. The 24V driving voltage output by the first output power supply circuit is used for directly driving a direct current motor and supplying (newly added) power to a drive control chip U3 (with a model of FT8132Q), and a voltage signal output by the second output power supply 520 is input to the drive control chip as a speed regulation signal.

In this embodiment, the first output power supply circuit 510 comprises a unilateral diode D1 connected to the first output end of the transformer T1, a filter capacitor CAL2 connected to a negative pole of the unilateral diode D1, a parallel resistor R50 connected to the filter capacitor CAL2 in parallel, and a parallel capacitor C2 connected to the parallel resistor R50 in parallel. A first end of the parallel capacitor C2 is connected to the negative pole of the unilateral diode D1 and a source of the drive chip U3, and a second end of the parallel capacitor C2 is grounded.

In this embodiment, the bus voltage isolation detection circuit 520 comprises a unilateral diode D3 connected to the second output end of the transformer T1, a series resistor R28 connected to a negative pole of the unilateral diode D3, a series resistor R31 connected to the series resistor R28 in series, and a clamp diode D7 having a positive pole connected to the series resistor R31 and an output end connected to a speed regulation pin (VDC) of the drive control chip U3.

The voltage control chip circuit 530 of this embodiment comprises a power supply control chip IC1 (KP21827MDP) and a peripheral circuit thereof. The output end of the rectifier unit is provided with a bus capacitor CAL1, a unilateral diode D3 connected to the second output end of the transformer T1, a series resistor R28 connected to the negative pole of the unilateral diode D3, a series resistor R31 connected to the series resistor R28 in series, and a clamp diode D7 having a positive pole connected to the series resistor R31 and an output end connected to a speed regulation input end pin of the drive control chip.

Figure 5:
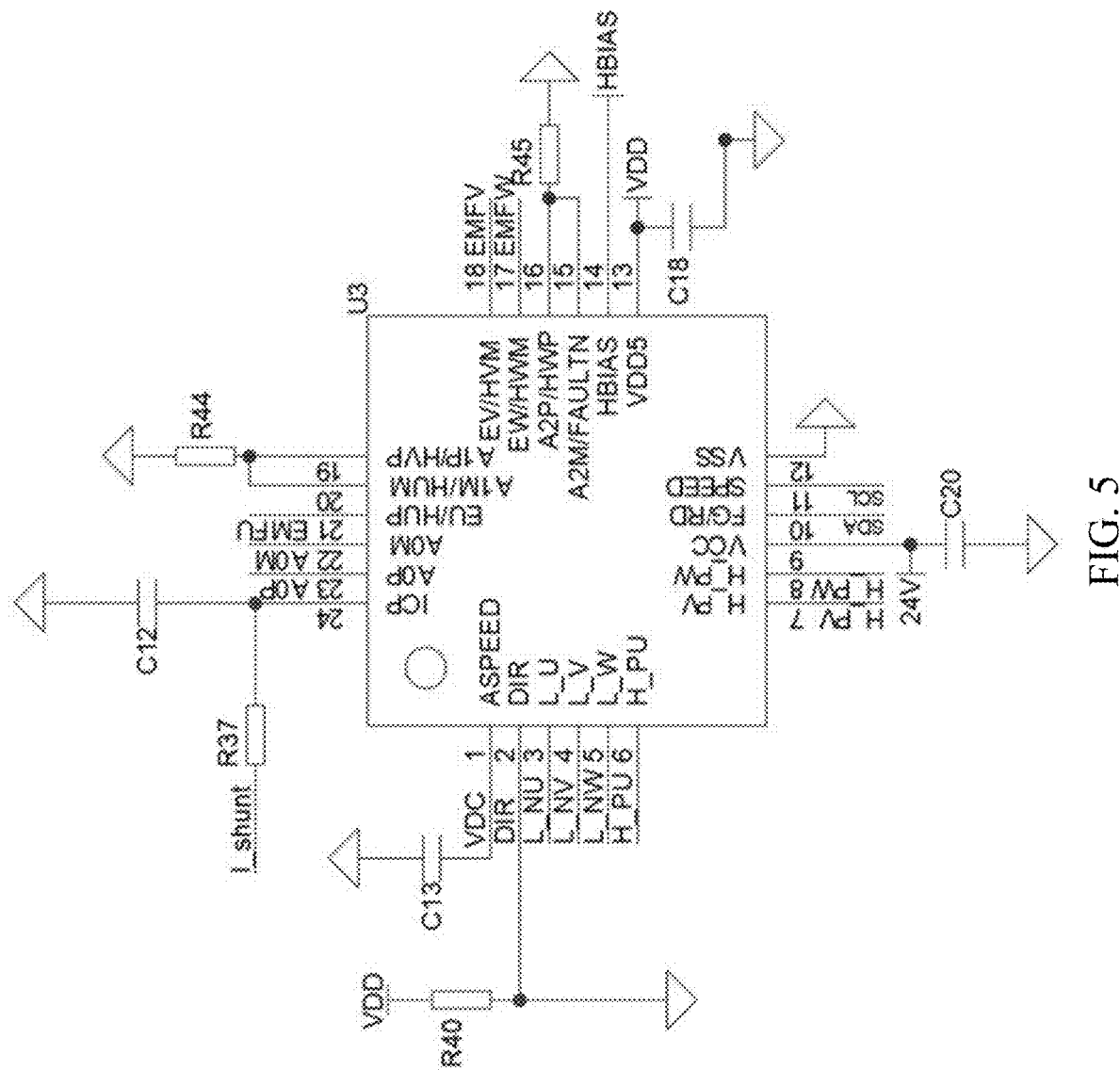
FIG. 5 is a schematic diagram of a circuit of a drive chip of the fan drive system according to the present invention.
Figure 6:
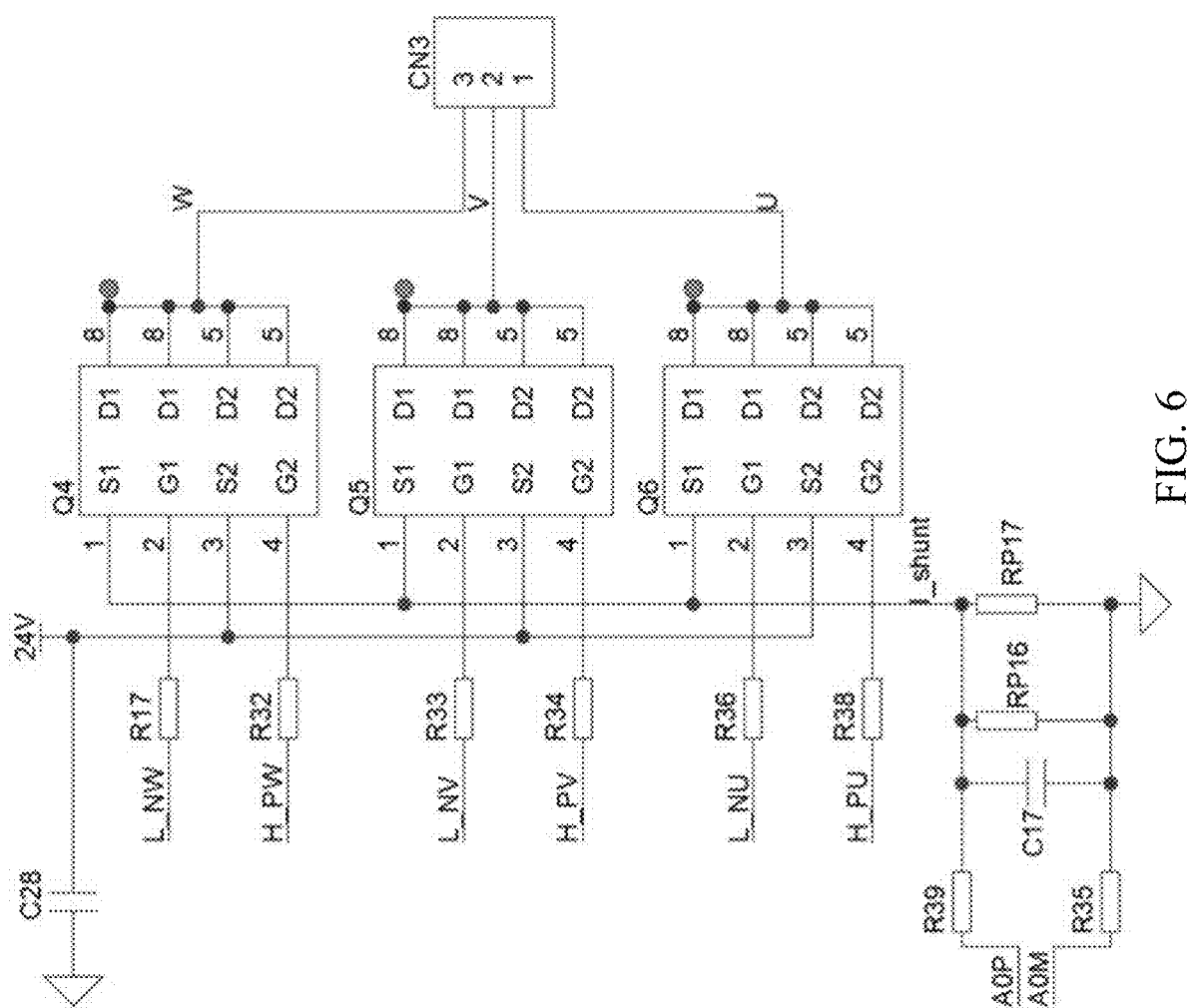
FIG. 6 is a schematic diagram of a drive circuit of the fan drive system according to the present invention.
Figure 7:
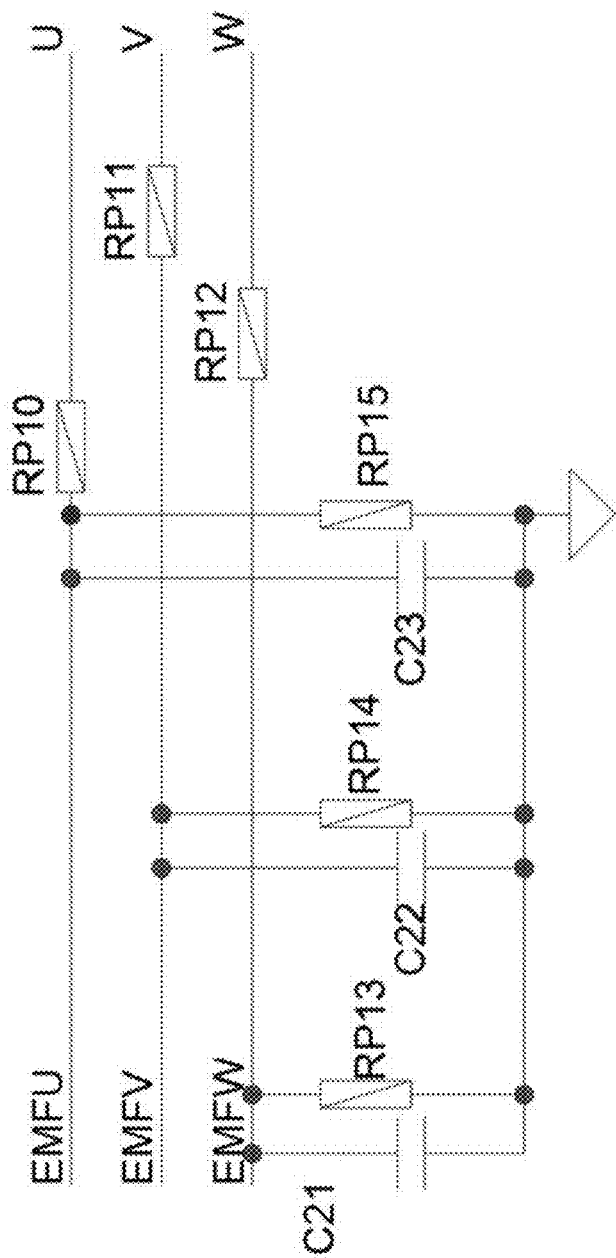
FIG. 7 is a schematic diagram of a voltage feedback circuit of the drive circuit according to the present invention; and, FIG. 8 is a schematic diagram of a fan incorporating a fan blade, a direct current motor, and a fan drive system according to the present invention.
Figure 8:
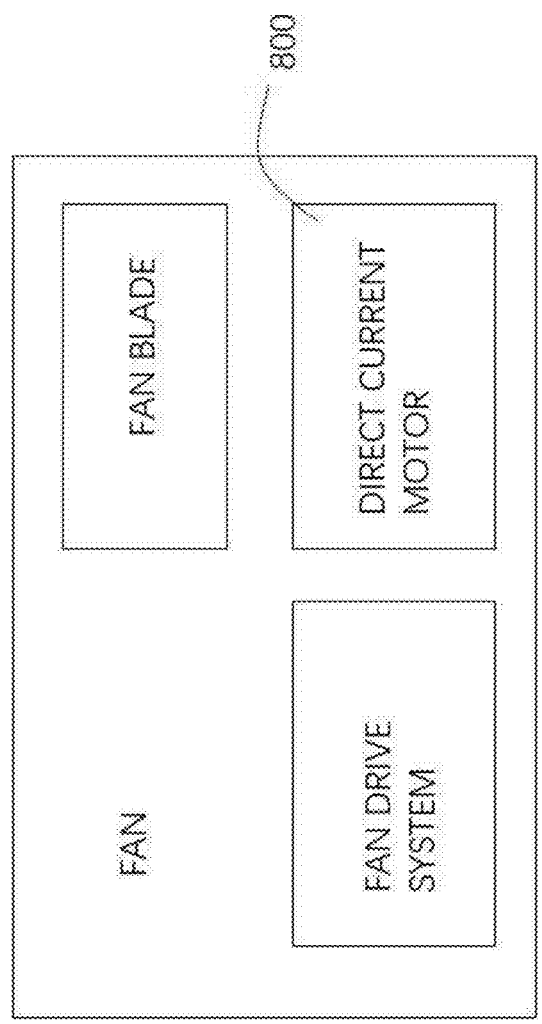

FIGS. 5 to 7 are schematic diagrams of the circuit of the direct current motor drive unit in this embodiment. This circuit is conventional and is not described in detail in this embodiment.

The present disclosure combines capacitor current-limiting speed regulation of an alternating current fan with analog signal control speed regulation of a single chip microcomputer driven by a brushless direct current motor; the speed is regulated through a capacitor switch on a high-voltage input side, and the speed regulation circuit is simple, high in reliability and low in cost. Meanwhile, a fan manufacturer can still use an original capacitor speed regulation switch box for speed regulation of an alternating current fan without replacement, and the product has continuity.

Based on the above, the present invention also provides a fan, comprising a fan blade, a direct current motor, and the fan drive system according to the above embodiments.

It should be noted that the present disclosure is not limited to the above embodiments. According to the creative spirit of the present disclosure, those skilled in the art can also make other modifications, which should not be interpreted as limiting the scope of the present disclosure. It should be noted that all modifications and substitutions equivalent to the embodiment should be included in the scope of the present disclosure. Therefore, the scope of protection of the present disclosure shall be subject to the scope defined in the claims.

What is claimed is:

1. A fan drive system, comprising: an alternating current power supply, a filter unit, a rectifier unit, a bus capacitor, a switching power supply, and a direct current motor drive unit; wherein
   a speed regulation switch is provided between the alternating current power supply and the filter unit, an output end of the filter unit is connected to an input end of the rectifier unit, and an output end of the rectifier unit is connected to an input end of the switching power supply;
   the switching power supply is provided with a bus voltage isolation detection circuit, the bus voltage isolation detection circuit is configured to detect voltages at two ends of the bus capacitor, an output end of the switching power supply is connected to the direct current motor drive unit for supplying power, and an output end of the bus voltage isolation detection circuit is connected to the direct current motor drive unit for inputting a speed regulation signal; and
   the direct current motor drive unit is connected to a direct current motor for driving the direct current motor.

2. The fan drive system according to claim 1, wherein the speed regulation switch is arranged at a live wire or a neutral wire between the alternating current power supply and the filter unit.

3. The fan drive system according to claim 2, wherein the speed regulation switch comprises: a plurality of capacitors arranged in parallel and a gear selection switch, the plurality of capacitors arranged in parallel have different capacities, and the gear selection switch is selectively connected to different capacitors.

4. The fan drive system according to claim 3, wherein the filter unit comprises: a fuse FS1 connected to an output end of the speed regulation switch, a thermistor NTC1 connected to an output end of the fuse FS1, and an inductor L4, a filter capacitor CM2, a filter capacitor CMP3 and a filter capacitor CMP4 that are connected to an output end of the thermistor.

5. The fan drive system according to claim 4, wherein the rectifier unit comprises a rectifier chip M1 connected to two output ends of the inductor L4.

6. The fan drive system according to claim 5, wherein the switching power supply comprises a power supply control chip circuit, a transformer T1, a first output power supply circuit, and the bus voltage isolation detection circuit, the first output power supply circuit is connected to a first output end of the transformer T1 for outputting a 24V driving voltage, an input end of the bus voltage isolation detection circuit is connected to a second output end of the transformer T1, and the output end of the bus voltage isolation detection circuit is connected to a drive control chip of the direct current motor drive unit.

7. The fan drive system according to claim 6, wherein the first output power supply circuit comprises: a unilateral diode D1 connected to the first output end of the transformer T1, a filter capacitor CAL2 connected to a negative pole of the unilateral diode D1, a parallel resistor R50 connected to the filter capacitor CAL2 in parallel, and a parallel capacitor C2 connected to the parallel resistor R50 in parallel having a first end connected to the negative pole of the unilateral diode D1 and a source of the drive chip U3, and a second end connected to ground.

8. The fan drive system according to claim 6, wherein the bus voltage isolation detection circuit comprises: a unilateral diode D3 connected to the second output end of the transformer T1, a series resistor R28 connected to a negative pole of the unilateral diode D3, a series resistor R31 connected to the series resistor R28 in series, and a clamp diode D7 having a positive pole connected to the series resistor R31 and an output end connected to a speed regulation input end pin of the drive control chip.

9. The fan drive system according to claim 6, wherein the output end of the rectifier unit is provided with a bus capacitor CAL1, the bus voltage isolation detection circuit comprises a unilateral diode D3 connected to the second output end of the transformer T1, a series resistor R28 connected to the negative pole of the unilateral diode D3, a series resistor R31 connected to the series resistor R28 in series, and a clamp diode D7 having a positive pole connected to the series resistor R31 and an output end connected to a speed regulation input end pin of the drive control chip.

10. A fan, comprising a fan blade, a direct current motor, and the fan drive system according to claim 1.

* * * * *